(Specimens.) 3 Sheets—Sheet 1.

C. F. HÖNSCH & G. CORBION, Jr.
WOVEN TEXTILE FABRIC.

No. 596,267. Patented Dec. 28, 1897.

WITNESSES: INVENTORS
Carl F. Hönsch
George Corbion Jr.
By S. J. Van Stavoren
Attorney (Specimens.)

C. F. HÖNSCH & G. CORBION, Jr.
WOVEN TEXTILE FABRIC.

No. 596,267.

Patented Dec. 28, 1897.

WITNESSES:

INVENTORS
Carl F. Hönsch
George Corbion Jr.
By J Vanstavorn
Attorney (Specimens.)  3 Sheets—Sheet 3.

C. F. HÖNSCH & G. CORBION, Jr.
WOVEN TEXTILE FABRIC.

No. 596,267.  Patented Dec. 28, 1897.

Witnesses  
Inventors  
Carl F. Hönsch  
George Corbion Jr.  
Attorney

UNITED STATES PATENT OFFICE.

CARL FRANZ HÖNSCH AND GEORGE CORBION, JR., OF PHILADELPHIA, PENNSYLVANIA, ASSIGNORS TO SAID CORBION, JR.

WOVEN TEXTILE FABRIC.

SPECIFICATION forming part of Letters Patent No. 596,267, dated December 28, 1897.

Application filed February 11, 1892. Serial No. 421,176. (Specimens.)

*To all whom it may concern:*

Be it known that we, CARL FRANZ HÖNSCH, a subject of the Emperor of Germany, and GEORGE CORBION, Jr., a citizen of the United States, both residing at Philadelphia, in the county of Philadelphia and State of Pennsylvania, have invented certain new and useful Improvements in Woven Textile Fabrics; and we do hereby declare the following to be a full, clear, and exact description of the invention, such as will enable others skilled in the art to which it appertains to make and use the same.

Our invention has relation to textile fabrics generally, but particularly to design fabrics having a number of sets of warps or a body or ground warp and a binder or secondary warp; and it has for its object to provide a fabric, whether plain or figured, of a more thoroughly bound texture and of increased durability from the least amount of material or stock and at a minimum cost, and to this end one set of warp-threads is always divided and is a binder-warp only, and the other set of warp-threads is either up or down or divided or both combined, and is either a figuring or a ground warp, as the requirements of the fabrics demand. As one set of warp-threads is always divided and used as a binder only, it is either entirely concealed or appears only on one surface of the fabric, and consequently it may be of a lower or cheaper grade of stock than that of the other set or body-warp to cheapen the cost of the fabric. Furthermore, as the low-grade or binder warp appears only on one side of the fabric—as, for instance, on the back of single-face goods—the body or ground warp may, if desired, be all thrown to the face of the fabric, thereby requiring less material for it to further cheapen the cost of the fabric, and in addition thereto an apparent better grade of goods can be made with a minimum amount of material, this being particularly the case for apparent fine-grade plain or figured fabrics. Furthermore, as all of said body or ground warp is thrown to the face or one side of the fabric a less number of picks per inch is required for making an apparent finer grade of goods, thereby increasing the output and still further cheapening the cost of the fabric.

Our invention has for its further object a design or figured fabric the design or figure lines or threads of which are distinctive in outline, form part of the body of the fabric, and are so placed or located relatively to one another and so woven that a high economy in the amount of stock required for simple or elaborate designs or figures is effected and which when desired admit of using low-grade or cheap filler, stuffer, or body weft stock, thereby further materially diminishing the cost of production of simple or elaborate design or figured fabrics without affecting their appearance as to quality or richness of effect and durability. To this end the figure or design is essentially composed of separated lines or threads, singly or in series. Each design line or thread or each series of lines or threads constituting a design-line is separated from a succeeding design-line by interspaces, and each such line is flushed—*i. e.*, exposed on the face of the fabric—and unflushed—*i. e.*, covered and concealed—into similar or varying lengths, as required to produce the outline of the figure or design. It is therefore made up of separated parallel lines or threads flushed into varying or similar lengths or sections. The spaces between the succeeding design-lines and the spaces between the flushed parts of each design-line or its unflushed parts are produced and covered by the ground or body warp, and the design-lines, as well as all other lines or wefts introduced to form the fabric, are bound by the secondary warp independent of the body-warp, which avoids floating of any part of the design-lines on either surface of the fabric, as has heretofore been the case in ordinary design-weaving.

When two series of different-colored design-lines follow each other in single-face or reversible goods in which the unflushed parts of a design-line appear on the opposite face of the fabric, the unflushed parts or sections of one series or color design-line are followed by the unflushed parts of the other series or color, and the latter or the second series or color lines then also serve as binder-wefts for the body or ground warp threads floated to cover the spaces between said lines and their unflushed parts. In fabrics where no filler, stuffer, or body wefts separate the successive design-lines they both serve to bind the body-warps. When body or stuffer wefts are introduced between successive design-lines, they serve as body-warp binders, in which case all the body-warp may be either up to cover the body-weft on one face, or said warp may be divided to cover the body-wefts on each face for reversible fabrics. By binding the body-warp as just described various designs of more or less complexity or elaborateness are produced having separated successive design-line sections or flushed parts overlapping each other or otherwise suitably disposed or arranged, as desired, if such overlapping and other disposition or arrangement of the successive design-line sections is necessary for the outlines of the design—a result not heretofore accomplished in the character of fabric and weave described.

The degree of spacing between the successive design-lines may be varied, as desired, by either only using or floating the ground or body warp for producing said spacing, in which case it is reduced to a minimum, or it may be increased, as desired, by introducing a more or less number of filler, stuffer, or body wefts or threads between the succeeding design-lines and floating the body-warp over said wefts. In any case such spacing, as well as the unflushed parts of the design-lines, are produced and covered by the floating ground or body warp thereat in contradistinction to such spaces being produced by the transposition of succeeding picks, as in ordinary design-weaving. Furthermore, the design-lines woven as above described being part of the body of the fabric and also being binders for the floated body-warp threads are to be contradistinguished from design-lines formed by extra picks, which are not a part of the body of the fabric proper and do not serve as binders for floated body-warp threads.

Our invention accordingly consists of a fabric as hereinafter more particularly described in the specification and pointed out in the claims.

Reference is had to the accompanying drawings, wherein—

Figure 1 is a face view of a design fabric with its design wefts or threads extended or not beaten up to more plainly indicate their arrangement or the construction of the fabric and the design or figure woven therein, the same being without stuffer, filler, or body wefts between successive design lines or threads, but a single stuffer-weft being shown as a dividing-line between the plain and design weaves. Fig. 2 is an end view of same, looking in the direction of arrow $x$, showing changes in position or transposition of the body-warp or sections thereof for flushing and unflushing the design-lines and for floating said warp or sections thereof in the spaces between the design-lines and at their unflushed parts. Fig. 3 is a section on the line 1 1, Fig. 1, with the wefts still more extended, showing more plainly the transposition of the ground or body warp for flushing and unflushing the design-lines and the secondary warp binding all the wefts independent of the body-warp. Fig. 4 is a view similar to Fig. 1, showing body-wefts or filler or stuffer threads introduced between the successive two series or different color design-lines. Fig. 5 is an end view of the same similar to Fig. 2, looking in the direction of arrow $y$. Fig. 6 is a section on the line 2 2, Fig. 4. Fig. 7 is a like view on same line with wefts further extended. Fig. 8 is a view similar to Figs. 1 and 4, showing a two-face or reversible design fabric. Fig. 9 is an end view of same, looking in direction of arrow $z$. Fig. 10 is a view similar to Fig. 9, with wefts still farther extended. Fig. 11 is a face view of a fabric having a single-color design or figure. Fig. 12 is a plan illustrating cards as cut for double-face or reversible design fabrics, each line representing a card and showing the following or succeeding design-line card cut the reverse of the preceding design-line card in their order from below upwardly. Fig. 13 is a like view illustrating cards cut for a single-face design fabric. Fig. 14 is a plan or face view of a fabric having a single-color-line design with body or filler wefts between succeeding design-lines, said fabric being shown of a rib or rep weave or form and the body-warp divided at and floated over and under the threads forming the ribs or reps bound by the design-lines; and Figs. 15 and 16 are sectional views showing more plainly such division and binding of the body-warp.

A represents a fabric composed of a warp divided into two sections $a\,a$ and $b\,b$, the former being the body or ground warp and the latter the secondary or binder warp, and of wefts $c$, which may be filler, stuffer, body, or other wefts, as desired, all of which are thoroughly bound by the secondary warp $b\,b$, which is therefore used as a binder-warp only and is either concealed from view, as indicated more plainly in double-face goods shown in Fig. 8, or appears only on one face of the goods, and that its back face, in single-face goods.

The body-warp $a\,a$ may be all thrown to either face of the fabric or divided and part thrown to each face. In any case it is bound by the wefts, as plainly indicated in the drawings. As the secondary warp is a binder only, a cheap grade of stock may be used for it, and as the body-warp is not used as a binder less stock for it and a less number of pick per inch are required to make apparently fine-face fabrics, thereby effecting an economy in the time required for weaving, which results in an increased output and materially cheapens the cost of the same.

In Figs. 1 to 10, inclusive, the design-lines are indicated as wefts and are assembled or grouped in two series $d\,d$ and $e\,e$, respectively, which follow each other alternately, as shown. Each such design-line may be a single thread or weft, or it may be composed of a number of wefts or threads, and when grouped in series of two, as described, they are always of different colors. If they are both of a different color from that of the ground-warp $a\ a$, a two-line design is produced; but if one is of the same color as that of the body-warp a single-color design is made, as indicated in Figs. 11 and 14. The succeeding design-lines are separated by spaces $f\ f$, and each design-line is flushed or divided into sections or lengths $g$ and $h$, respectively, between which are the spaces $m$ and $n$ or the unflushed parts of such lines. The flushed parts or sections $g$ and $h$ of the design-lines may be of similar or various lengths, as may correspondingly be the unflushed parts or spaces $m$ and $n$, as the requirements of the design or figure demand. The unflushed parts $m$ and $n$ of each design-line may be transposed to the opposite face of the fabric, in which case they will be flushed on that face, or they may be depressed to the center of the fabric, in which case they will be concealed and not appear on either face of the fabric.

The flushed parts $h$ of the design-line $e$ succeeding the design-line $d$ always follow the unflushed sections or parts $m$ of the line $d$, and reversely, as shown in the figures of the drawings, and these flushed and unflushed parts may be relatively of the same or varying lengths, as desired for the figure or design, to produce successive design-lines, flushed sections, or parts of the same length or of different lengths, in which latter case they overlap each other, as shown more plainly in the design "O" of the design-figures 101, illustrated in the drawings.

The interspaces $f\ f$ between the design-lines and the unflushed parts of the design-lines are produced and covered by floating the body-warp in or over the wefts, and such floated parts of the body-warp are bound by design line or lines. In cases where the two series of design-lines alternately following one another are used the second line or series $e\ e$ serves for binding such floated parts of the body-warp.

The spaces $f\ f$ between the lines may be formed only by the body-warp, as shown in Figs. 1 to 3, inclusive, in which case said spaces are reduced to a minimum; or, if desired, filler, stuffer, or body wefts $l$ may be introduced between the design-lines to increase said spacing $f\ f$. In Figs. 4 to 10, inclusive, such filler or other wefts are shown between every two series of different-colored design-lines $d\ d$ and $e\ e$; but they may be otherwise introduced as desired.

The number of the picks or wefts $l$ introduced between succeeding design-lines varies the extent of the interspacing $f\ f$.

Where the body or filler wefts $l$ are introduced between successive design-lines, such wefts $l$ bind the floated parts of the body-warps, (see more plainly Fig. 14,) and by using such wefts of suitable gage or size in cross-section, or a cluster of them, rib or rep goods of any desired size or projection of rib or rep may be made, in which case the design-lines are in the hollows or depressions between the ribs or reps and the latter form the interspaces between the succeeding design-lines.

When filler or stuffer wefts $l$ are introduced before or after each design-line, they also serve as cover-wefts to prevent the transposed portions of the design-lines shimmering through to the opposite face of the fabric.

In Figs. 1 to 3, inclusive, a fabric having two successively differently colored lines without filler, stuffer, or body wefts is shown. In this case the design-lines form the body-wefts as well as the design-lines.

In Figs. 4 to 7, inclusive, filler, stuffer, or body wefts $l$ are shown between two sets of design-lines of the fabric. Figs. 8 to 10, inclusive, show similarly-introduced stuffer or body wefts; but the ground or body warp $a\ a$ is divided or partly thrown up and down to float in the interspaces $f$ and the unflushed parts $m\ n$ of the design-lines $d\ e$ to produce a two-face or reversible fabric having finished faces.

In Fig. 11 a single line or color design is shown, which may be a single or two face fabric, as desired.

In Fig. 12 are illustrated cut cards for producing double-faced fabrics, as above described for Fig. 8, each line of Fig. 12 representing a card and showing that the card for each design-line $e\ e$ is cut the reverse of the card for the preceding design-line $d\ d$ and that the body-warp is divided so as to be thrown to both surfaces for floating it in the spaces $f\ f$ and $m\ n$, as indicated at $p\ p$.

Figures 1, 2:
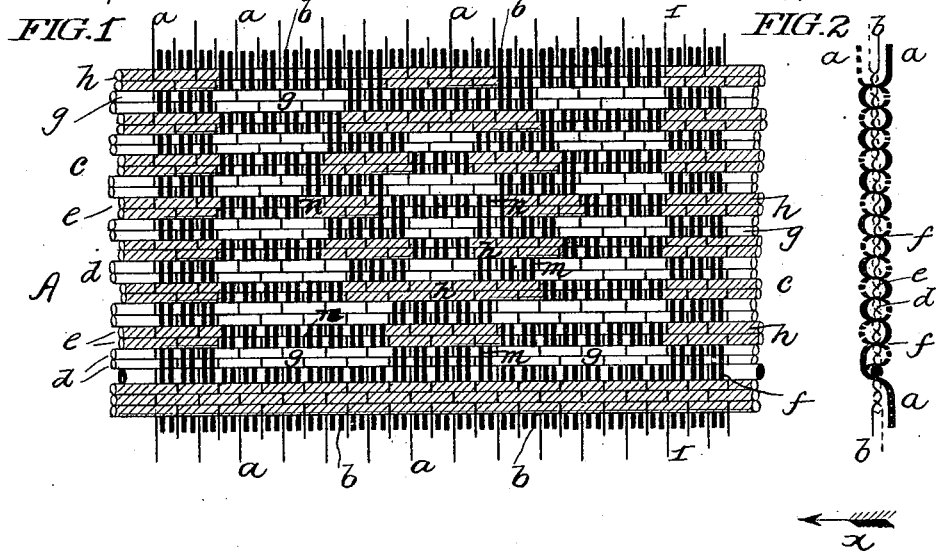
Figure 3:
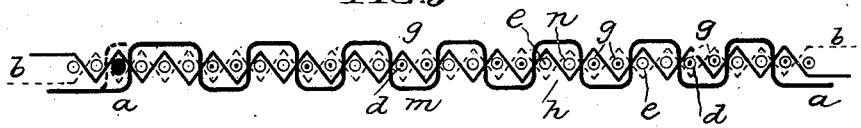
Figures 4, 5, 6:
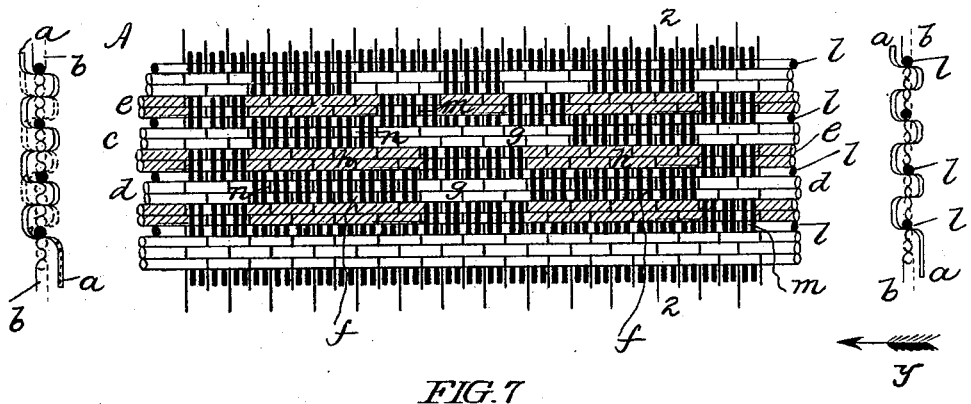
Figure 7:
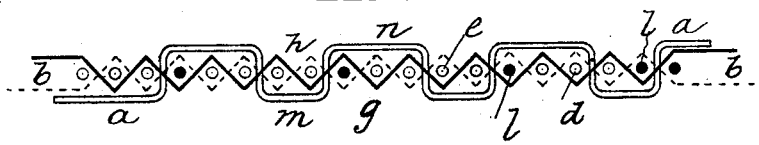
Figure 8:
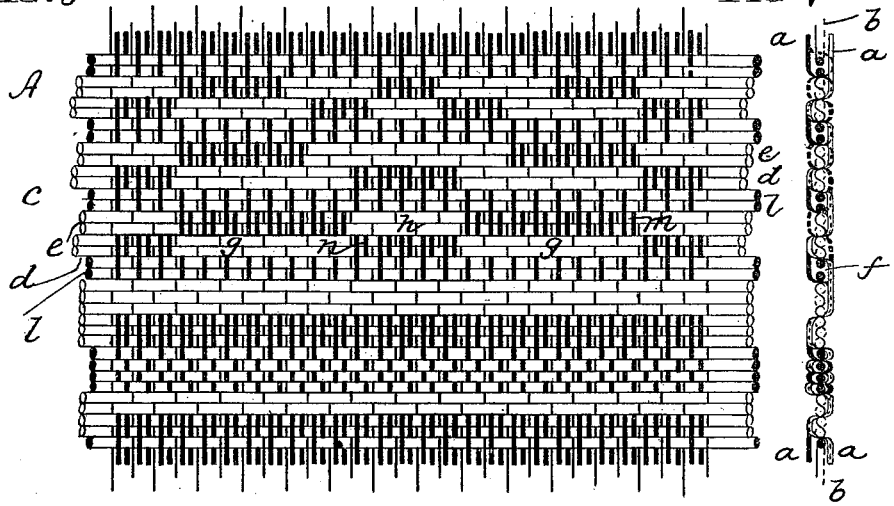
Figure 9:
Figure 10:
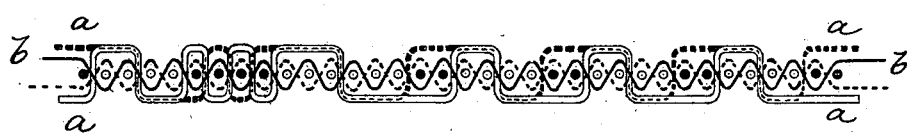
Figure 11:
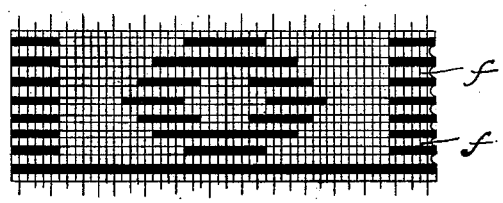
Figure 12:
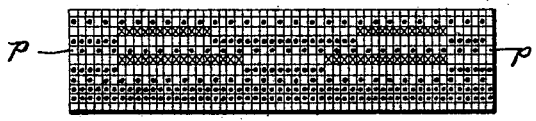
Figure 13:
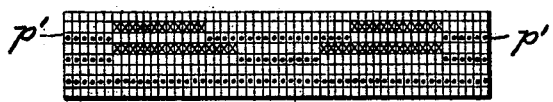
Fig. 13 shows cards correspondingly cut for single faces, with the body-warp all thrown up or down to float said spaces, as indicated at $p'\ p'$.
Figure 14:
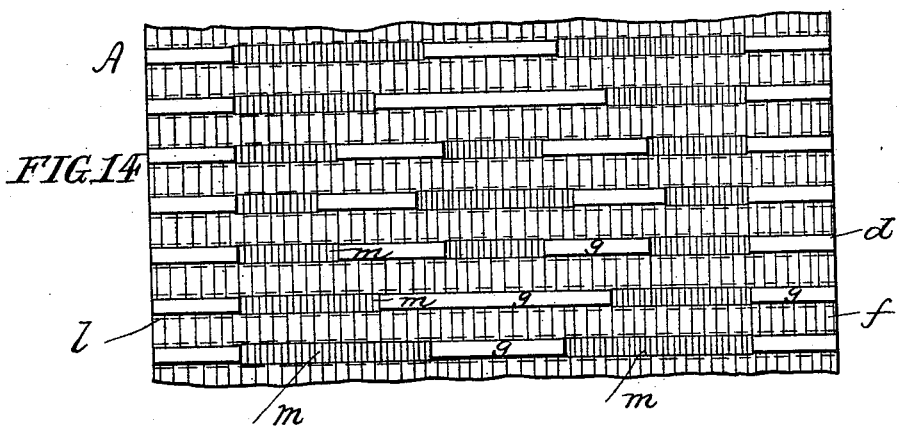
Fig. 14 shows the rep or rib weave fabric with single-color design-lines in the depressions or hollows between the ribs or reps, the body-warp being divided and thrown up over and down under the ribs or reps, as more plainly shown in Figs. 15 and 16.
Figure 15:
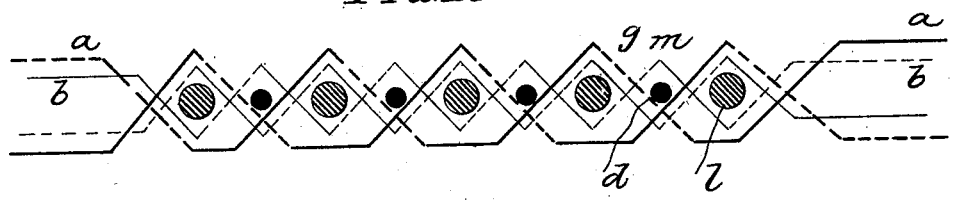
Figure 16:
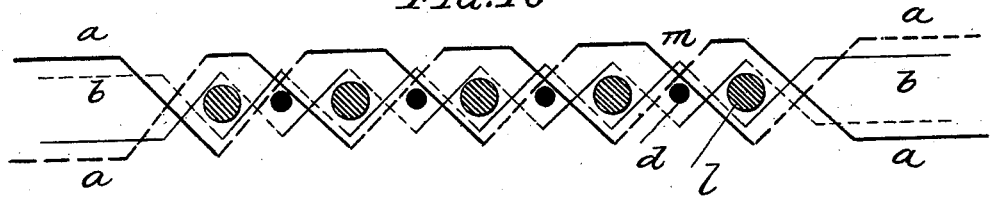

From the foregoing it will be noted that the design-lines may be in two series of different colors alternately following one another and are transposed to define the figure or design by sections of the body-warps, which sections are floated to determine such defining and in turn are bound by the flushed sections of the design-lines; that the latter may be single lines of one or more picks, as desired, and may or may not be transposed from one surface to another; that the body-warp may be all floated over the unflushed parts of the design-lines to one surface of the goods or divided and thrown equally or otherwise to both faces of the fabric, and that all the wefts are bound by the secondary warp independent of the body-warp, the result whereof is that less stock for the design line or threads is required to produce the general outline of the figure or design, which diminishes the cost of the fabric, and a finer apparent grade of goods having simple or elaborate designs of the character described can be produced, which heretofore it has been impossible to accomplish.

It will be obvious that by reason of the divided binder-warp threads being controlled by the Jacquard cards such threads are operative independently of each other throughout the width of the fabric, and hence an all-plain portion may be produced in the figured fabric, the binder-warp in that case being used in conjunction with the body-warp in supplying its own quota to the ground—as one-half, one-third, or one-seventh of the whole warp engaged—to meet the requirements of the particular weave. It will also be obvious that by this independent action of the binder-warp threads they may, while binding two or more stuffer or body wefts, also bind two or more silk picks such a distance only as the conditions of the design may require.

While we have shown only two different color series of design-lines, it is evident that more may be used, in which case the design or figure will have a multiplicity of separated lines of different color, and the floating of the warp in the interspaces $f$ of unflushed parts $m$ $n$ will result in a figured ground or warp. It is evident, therefore, that we do not limit our invention to the particular fabrics or designs thereon shown, as the same may be variously made and provided for without departing from the spirit of our invention. Thus, for instance, continuous design-lines or different weave of ground may be combined with the separated parallel-line design or figure for border interweaving in the design or otherwise, as desired.

What we claim is—

1. A fabric composed of a body-warp, a divided secondary warp, and a plurality of series of weft-threads flushed and unflushed into sections or lengths throughout the width of the fabric, the unflushed parts or sections of one series of weft-threads being followed by the flushed sections of the succeeding series, the flushed and unflushed sections of each series of such weft-threads being alternately produced by the ground or body warp, the secondary warp binding the wefts and the wefts binding the body or ground warp, substantially as described.

2. A fabric composed of a body-warp, a divided independent secondary warp, separated parallel design or figure lines or threads forming part of the body of the fabric, each design-line being a weft or wefts flushed and unflushed into lengths or sections and bound throughout the entire width of the fabric by the independent divisions of the secondary warp, and the spaces between succeeding lines and the unflushed parts of each design-line being formed by the body-warp, substantially as described.

3. A design fabric having a divided independent secondary warp, a body-warp, and separated design-lines composed each of two series of different-colored weft-threads flushed and unflushed into sections or lengths throughout the width of the fabric, the unflushed parts or sections of the first series of design-lines being followed by the flushed sections of the succeeding series, the flushed and unflushed sections of each series of such design-lines being alternately produced by the ground or body warp threads, the secondary warp binding the two series of design-lines and the latter being the binder-wefts for the body or ground warp, substantially as described.

4. A design fabric having a divided independent secondary or binder warp, a body-warp, separated design-lines composed each of two series of different-colored weft-threads flushed and unflushed into sections or lengths, and a series of body-wefts, the unflushed parts of the first series of design-lines being followed by the flushed sections of the succeeding series, the flushed and unflushed sections of each series of such design-lines being alternately produced by the ground or body warp threads, substantially as described.

In testimony whereof we affix our signatures in presence of two witnesses.

CARL FRANZ HÖNSCH.
GEORGE CORBION, Jr.

Witnesses:
JOHN RODGERS,
S. J. VAN STAVOREN.